US010776751B2

(12) United States Patent
Chin

(10) Patent No.: US 10,776,751 B2
(45) Date of Patent: Sep. 15, 2020

(54) VERTICAL NETWORK COMPUTING INTEGRATION, ANALYTICS, AND AUTOMATION

(71) Applicant: Visa International Services Association, San Francisco, CA (US)

(72) Inventor: Alfred Chin, Los Altos, CA (US)

(73) Assignee: Visa International Service Association, San Francisco, CA (US)

( * ) Notice: Subject to any disclaimer, the term of this patent is extended or adjusted under 35 U.S.C. 154(b) by 150 days.

(21) Appl. No.: 15/937,002

(22) Filed: Mar. 27, 2018

(65) Prior Publication Data
US 2018/0211212 A1    Jul. 26, 2018

Related U.S. Application Data

(63) Continuation of application No. 13/460,271, filed on Apr. 30, 2012, now Pat. No. 9,996,815.

(60) Provisional application No. 61/481,040, filed on Apr. 29, 2011.

(51) Int. Cl.
*G06Q 30/00* (2012.01)
*G06Q 10/08* (2012.01)
(52) U.S. Cl.
CPC .................. *G06Q 10/087* (2013.01)
(58) Field of Classification Search
CPC .......... G06Q 30/00; G06Q 20/20; G06F 9/46
USPC ...................... 705/28, 7; 235/385
See application file for complete search history.

(56) References Cited

U.S. PATENT DOCUMENTS 5,715,314 A * 2/1998 Payne .................. G06Q 10/087
705/26.35
7,054,837 B2   5/2006 Hoffman
7,222,786 B2 * 5/2007 Renz ...................... G06Q 10/06
235/385
7,822,679 B1  10/2010 Vaux
(Continued)

FOREIGN PATENT DOCUMENTS

WO      01-82135 A1    11/2001
WO   2002/037376 A1    5/2002
(Continued)

OTHER PUBLICATIONS

International Search Report dated Nov. 28, 2012 in Application No. PCT/US2012/035630.
(Continued)

*Primary Examiner* — Talia F Crawley
(74) *Attorney, Agent, or Firm* — Kilpatrick Townsend & Stockton LLP

(57) ABSTRACT

Embodiments of the invention can relate to methods, systems, apparatuses directed to integration of computing networks, especially within supply chains, and use of information from these integrated networks to generate analytics. To generate such analytics, an analysis computer or payment processing network may receive purchase data. In various embodiments the purchase data may include a product identifier that is associated with a product or service that is involved in the purchase. Once the purchase transaction with the product identifier is received, consumption of inventory at the merchant or supplier may be tracked. Tracking the consumption of inventory may involve storing and using a relationship between the product identifier and the inventory.

6 Claims, 6 Drawing Sheets

(56) References Cited

U.S. PATENT DOCUMENTS

| | | | |
|---|---|---|---|
| 2002/0147622 A1* | 10/2002 | Drolet | G06Q 10/06 705/7.25 |
| 2003/0009416 A1 | 1/2003 | Mara | |
| 2003/0065541 A1 | 4/2003 | Menninger | |
| 2003/0074284 A1 | 4/2003 | Bowden | |
| 2003/0144942 A1* | 7/2003 | Sobek | G06Q 20/04 705/36 R |
| 2004/0078328 A1* | 4/2004 | Talbert | G06Q 20/04 705/40 |
| 2005/0199707 A1* | 9/2005 | Beck | G06O 20/203 235/380 |
| 2006/0149640 A1* | 7/2006 | Gordon | G06Q 20/20 705/26.2 |
| 2007/0050229 A1* | 3/2007 | Tatro | G06Q 10/087 705/15 |
| 2007/0226231 A1 | 9/2007 | Venkat | |
| 2009/0018996 A1 | 1/2009 | Hunt | |
| 2010/0138264 A1 | 6/2010 | Faris et al. | |
| 2010/0145864 A1 | 6/2010 | Boesjes | |
| 2010/0250411 A1* | 9/2010 | Ogrodski | G06Q 10/10 705/30 |
| 2012/0011063 A1* | 1/2012 | Killian | G06Q 20/105 705/41 |

FOREIGN PATENT DOCUMENTS

| | | |
|---|---|---|
| WO | 2010/060181 A1 | 6/2010 |
| WO | 2010/129342 A2 | 11/2010 |

OTHER PUBLICATIONS

U.S. Appl. No. 12/940,562, filed Nov. 5, 2010, entitled, "Merchant Timing System and Method" 49 pages.

Final Office Action for U.S. Appl. No. 13/460,271 dated Dec. 26, 2013, 16 pages.

Final Office Action for U.S. Appl. No. 13/460,271, dated Mar. 16, 2016, 23 pages.

Final Office Action for U.S. Appl. No. 13/460,271, dated Feb. 21, 2017, 37 pages.

Non Final Office Action for U.S. Appl. No. 13/460,271, dated Sep. 10, 2013, 12 pages.

Non final office action for U.S. Appl. No. 13/460,271, dated Nov. 6, 2014, 16 pages.

Non-Final Office Action for U.S. Appl. No. 13/460,271, dated Jun. 18, 2015, 18 pages.

Non-Final Office Action for U.S. Appl. No. 13/460,271, dated Aug. 11, 2016, 23 pages.

Notice of Allowance for U.S. Appl. No. 13/460,271, dated Jan. 9, 2018, 9 pages.

* cited by examiner

VERTICAL NETWORK COMPUTING INTEGRATION, ANALYTICS, AND AUTOMATION

CROSS-REFERENCES TO RELATED APPLICATIONS

This application is a continuation of U.S. application Ser. No. 13/460,271, filed Apr. 30, 2012, which claims priority from U.S. Provisional Application No. 61/481,040, filed Apr. 29, 2009, all of which is incorporated herein by reference in its entirety for all purposes.

BACKGROUND

Efficient management of a business supply chain is important for any business involved with sales of goods or services. While local automated inventory management by computer has been widely adopted, to properly manage inventory, businesses keep track of inventory count, maintain a sufficient amount of inventory on stock, and timely re-stock an appropriate amount of inventory in transactions between what may be large numbers of counterparties with separate computing devices for inventory management, sales, and supply chain communication. For many businesses, it is difficult to maintain enough inventory on hand to satisfactorily fulfill customers' orders without over-stocking. A delicate balance is necessary to avoid over-stocking, which poses many risks such as tying up funds and incurring maintenance costs, including storage space expense, spoilage and damage, and depreciation of inventory value. This is even more of an issue for small businesses which may not be able to afford the expense of a complex custom supply chain management system that may be used by larger competitors.

Complicating a business's ability to manage such operational resources is that demands may fluctuate for a variety of reasons. Complications may include changes in customer behavior that are a result from seasonal demands, such as holidays. An example of a seasonal demand is the increase in demands for certain consumer products during Christmas or other similar holidays associated with gifts. Similar to seasonal effects, the business may decide to act in a way that influences customer behavior. For example, a business may provide incentives for customers to purchase its goods or services. Such incentives may include sales, coupons, promotions, advertisements and marketing, or any other incentives. Conversely, a business can act in a way that reduces demand for its products or services. For example, a business may raise prices or eliminate promotions or specials. In any of these ways, customer behavior may be affected in a fashion that the business managers cannot adequately predict. Such may be the case where the business lacks proper historical data to use as a basis for an accurate estimate. A business may lack sufficient historical data when, for example, it takes a business action (e.g., initiate a coupon campaign or releases a new product) for a first time or the business is a new business.

Additionally, small businesses typically lack the resources to prepare for supply chain disruptions that may be caused when supplies are not available. This may cause a small business to either overstock products and lose money by wasting space and money on unneeded supply, or alternatively to lose sales when products for sale run out, and the merchant must wait for new product to be delivered, during which time sales may be lost.

BRIEF SUMMARY

The innovations presented herein describe systems and methods for vertical computing integration, analytics, and automation, especially as relates to computing devices in networks across a supply chain. In certain embodiments, purchase data may be analyzed in conjunction with inventory data to create supply chain analytics. These supply chain analytics may be used by merchants, suppliers, and or customers to improve supply chain management and/or spend processing.

Certain embodiments may be directed to a system for generating information regarding a supply chain. The system may include a payment processing network configured to receive consumer purchases performed over a merchant system. The consumer purchases may include a product identifier. The payment system may also be configured to receive commercial transactions performed by a buyer and supplier. A commercial transaction may involve the exchange of purchase orders and invoices. Based on the consumer purchases and commercial transactions, the payment processing network can provide a consumer or supply chain participant information regarding a product or good.

Additional alternative embodiments may be directed to computing systems comprising: a processor, a network interface, and a storage medium. The storage medium may include instructions for performing a method of small business vertical spend analysis that involve receiving purchase data that is associated with a product and a merchant; receiving inventory data that is associated with the product and a supplier; analyzing the purchase data and the inventory data to generate supply chain analytics; and communicating a message based on the supply chain analytics.

Further alternative embodiments may include a payment processing network. In certain embodiments, a payment processing network includes an authorization module that receives authorization requests; an analysis module that receives purchase data derived from the authorization requests and that further receives inventory data, wherein the analysis module analyzes the purchase data and the inventory data to create supply chain analytics; and a messaging module that receives inventory data and communicates supply chain analytics messages.

Additionally, in one potential embodiment, the payment processing network can generate an estimate for the demand of inventory. In another potential embodiment, the payment processing network can generate an alert of the risk that a supplier may not meet a demand for a good. In another potential embodiment, the payment processing network is configured to send pricing information regarding goods to a merchant. In another potential embodiment, the payment processing network is configured to send pricing information regarding a product to a consumer.

BRIEF DESCRIPTION

DETAILED DESCRIPTION

Figure 1:
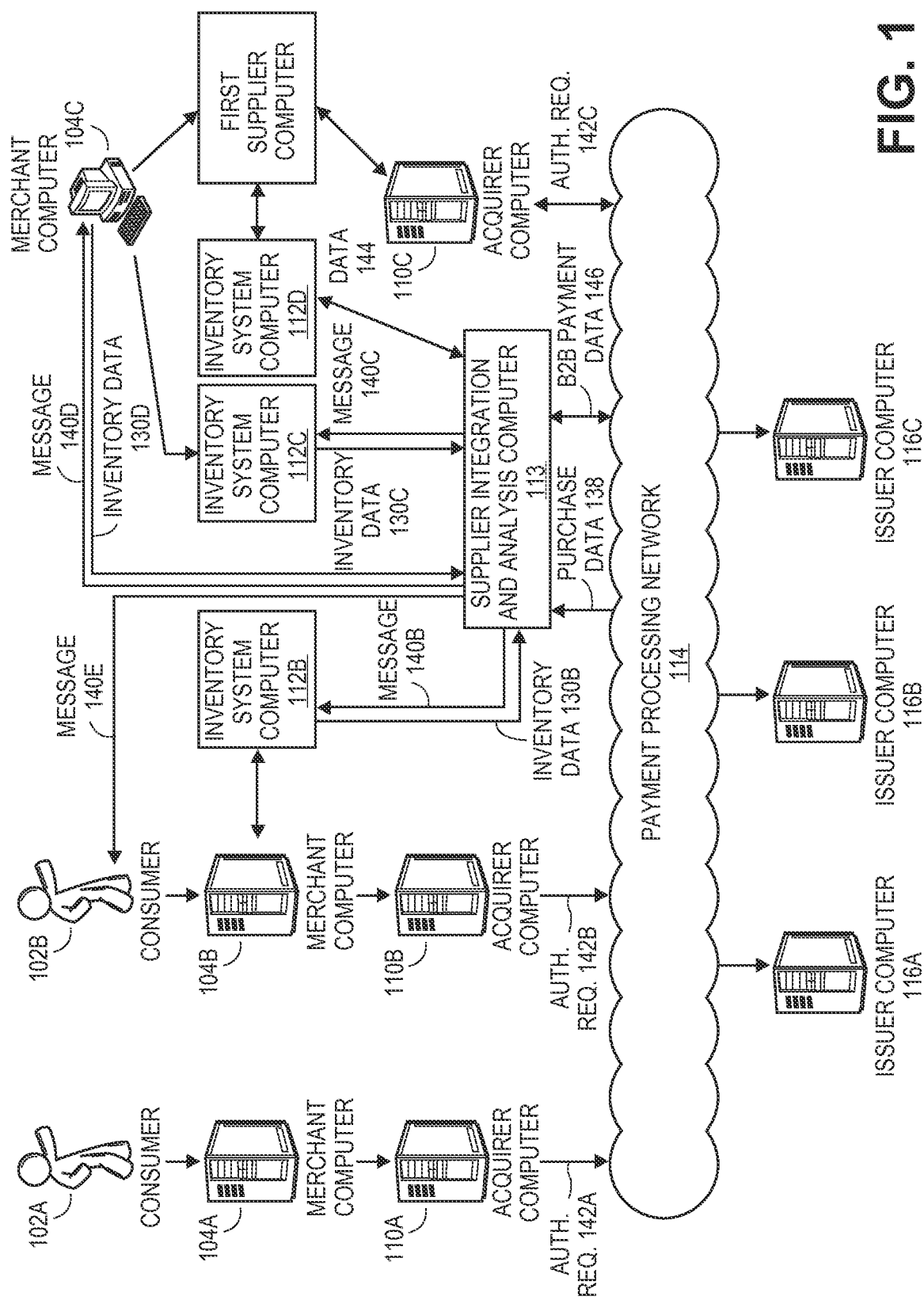
FIG. 1 is a diagram showing an example supply chain, according to one potential implementation of the innovations presented herein.

The present invention relates, in general, to vertical integration of computing integration, analytics, and automation and, more particularly, to enhancing merchant and supplier supply chain integration and automation coupled with payment processing, and improved analytics associated with supply chain analysis of data.

While various aspects and descriptive examples embodiments of the invention are discussed above and throughout the present application, the following detailed description illustrates embodiments in further detail to enable one of skill in the art to practice the invention. In the following description, for the purposes of explanation, numerous specific details are set forth in order to provide an understanding of the present invention. It will be apparent, however, to one skilled in the art that the present invention may be practiced without some of these specific details. In other instances, structures and devices that are non-limiting examples of embodiments are shown in block diagram form as illustrations. Several embodiments of the invention are described below and, while various features are ascribed to different embodiments, it should be appreciated that the features described with respect to one embodiment may be incorporated with another embodiment as well. By the same token, however, no single feature or features of any described embodiment should be considered essential to the invention, as other embodiments of the invention may omit such features.

I. Definitions and Introduction

Various embodiments described herein relate to systems, apparatus, and methods for enhancing computing integration, analytics, and automation. For example, in a system that functions in accordance with one potential embodiment according to the present innovations, merchant inventory management may be connected with a supplier integration system and a payment processing network. Inventory and sales data, some of which passes through the payment processing network, may be analyzed by an analysis computer portion of the supplier integration system. This analysis computer may create supply chain analytics that can predict demand or suggest future purchase orders for merchant based on the merchant inventory and sales history data. Similarly the analysis computer may monitor supplier inventory and warn the supplier when orders may be expected from a merchant, especially when orders may exceed inventory. Cross business analytics may also be included, such that a merchant is warned when a supplier may not be able to supply an upcoming order. Automation of purchase order changes based on analytics predictions may also be enabled. Such a system may also include other supply chain analytics and messaging to merchants, suppliers, and customers as is detailed below.

A "consumer" such as consumer 102 can be an individual or organization such as a business that is capable of purchasing goods or services or making any suitable payment transaction with merchant 104. In some embodiments, a consumer may further be referred to as a cardholder or account holder, and can refer to a consumer who has an account with an issuer that can be used to conduct transactions with merchants. A cardholder may have one or more portable consumer devices associated with the account, such as a credit card, debit card, mobile phone, etc., that can assist in the use of the account to conduct a transaction.

A "portable consumer device" such as portable consumer device can be any suitable device that can be used to conduct a payment transaction with merchant 104. A portable consumer device may be in any suitable form. For example, suitable portable consumer devices can be hand-held and compact so that they can fit into a consumer's wallet and/or pocket (e.g., pocket-sized). They may include smart cards, magnetic stripe cards, keychain devices (such as the Speedpass™ commercially available from Exxon-Mobil Corp.), etc. Other examples of portable consumer devices include cellular phones, personal digital assistants (PDAs), pagers, payment cards, security cards, access cards, smart media, transponders, and the like. Further, a portable consumer device may be associated with an account of a consumer such as a bank account or credit card account.

A "merchant" or "retail store" such as merchant 104 can offer goods or services to a consumer 102. Merchant 104 may use any suitable method to conduct a payment transaction with the user. For example, merchant 104 may use an e-commerce business to allow the payment transaction to be conducted by merchant 104 and consumer 102 through the Internet. Other examples of merchant 104 include a department store, a gas station, a drug store, a grocery store, or other suitable business. In some embodiments, a merchant may operate a merchant server that is a computing device as described below. A merchant server can be used to provide an online storefront for consumers to shop and also to conduct online transactions with consumers once the consumers have decided to purchase goods from the merchant. Merchants may be assigned identifiers that allow the identification of the merchant as part of various types of data such as sales and inventory data involving the merchant. Merchant 104 can be a retail store, business, individual, or any other merchant that offers products or services for sale. The retail store may have a warehouse or other facilities to store inventory.

As used herein, "inventory" can refer to an item or collection of items that is offered for sale, directly or indirectly, by the merchant 104. For example, a merchant that offers computers for sale may maintain inventory of computers or may maintain inventory of component parts of a computer (e.g., keyboards, monitors, CPUs, etc.).

A "supplier" such as supplier 106 is a business that can offer and sell goods or services to a merchant 102. Depending on the role of a business in any particular transaction, any given business may function as either a merchant or a supplier, with the merchant being the purchaser and the supplier being the seller. The role of a supplier for the purposes of this application is to sell products to other businesses. A business functioning as a seller in a transaction is distinguished from a business selling to a consumer because the transaction process for sales and payment authorization between businesses may be different than the process between a business and a consumer. Supplier 106 may use any suitable method to conduct a payment transaction with the merchant 102. For example, supplier 106 may use an e-commerce business to allow the payment transaction to be conducted by merchant 102 and supplier 106 through the Internet. Examples of suppliers may include food and beverage manufacturers that sell and supply product to merchant gas stations, grocery stores, and convenience stores. Suppliers may also be assigned a "merchant identifier" to enable identification of the supplier in various types of data.

Further still, in a supply chain, a supplier to a merchant may require components that are sourced from second tier suppliers, and a second tier supplier may require components that are sourced from a third tier supplier, such that a chain of suppliers may source components down through the supply chain to create an eventual product for sale by a merchant. In various embodiments of the innovations presented herein, a supplier may be any supplier at any level in a supply chain, such that data from the supplier may be analyzed to create supply chain analytics for any portion of the supply chain for a merchant or product.

As used herein, a "supply chain" can refer to a system of organizations, people, technology, activities, information and resources involved in moving a product or service from a supplier to a customer. In some embodiments, the parties of a supply chain may transform natural resources, raw materials and components into a finished product that is delivered to the end customer. The transformation of the materials and components can include any number of steps and any number of parties along the supply chain. A supply chain may be described in certain embodiments in terms of a consumer, a merchant, and one or more suppliers. However, it should be appreciated that a supply chain can include any number of entities not described herein. For example, some supply chains may include a distributor or warehouse that acts as a storage and distribution point of goods between various parties.

An "acquirer" such as acquirer 110 can be any suitable entity that has an account with merchant 104 and that processes merchant transactions associated with merchant access or point of sale device. For example, acquirer 110 may be a bank.

An "issuer" such as issuer 116 can be any suitable entity that may open and maintain an account associated with consumer 102. For example, issuer 116 may be a bank, a business entity such as a retail store, or a governmental entity that issues a payment account to consumer 102. In some embodiments, issuer 116 may also be the acquirer 104. Issuer 116 may also issue portable consumer device that is associated with an issued account.

A "product" or "good" includes any item for sale by a merchant or supplier. Products according to the present innovations may also include services for sale by a merchant or supplier. Products may have associated identifiers which enable improved electronic tracking of inventory levels and identification of the product in sales and analysis data. Product or good can refer to any material, component, or service. In some embodiments, a good may be in raw form, or one with minimal processing, such as logs, iron ore, crude oil, or any minimally processed material. In other embodiments, a good may be processed as the good moves through a supply chain. For example, crude oil may be processed into gasoline or kerosene.

An "authorization request," as used herein, refers to a message sent as part of a credit card transaction or a payment authorization process. In a typical consumer payment authorization process, a consumer purchases goods or services by presenting a portable consumer device or associated credit card information to a merchant computer. The merchant computer then generates an authorization request that includes, among other data, the credit card data. The merchant sends the authorization request to an acquirer. The acquirer sends the authorization request to a payment processing network which passes the authorization request to an issuer. The issuer generates an authorization response that indicates whether the transaction is approved or declined. The authorization response is sent back to the merchant, typically by that reverse of the route described above. In addition to the credit card information which may have an account number, expiration date, card verification value, or other identifiers, the authorization request may include a variety of other data. Such data may include product identifiers for the goods or services being purchased. One potential example of such an identifier may be a stock keeping unit or SKU number. The authorization request may also include a quantity purchased a merchant identifier and other similar data.

A business-to-business or B2B process may operate differently than a consumer payment authorization process described above. Such a B2B transaction, may originate with a purchase order created at a merchant location. The purchase order may be submitted to a supplier. The supplier may respond to the purchase order by sending an invoice along with the goods requested by the purchase order. Following this the merchant may initiate a payment that is similar to the payment process described above for a consumer transaction. The merchant may supply payment information to the supplier, supplier may communicate this information to an acquirer as part of an "authorization request." The acquirer may communicate the authorization request through payment processing network to an issuer which approves or denies the payment authorization request. In various alternative embodiments ordering an order approval for the merchant may be split in a situation where I merchant is managed from a separate location of the merchant business location. Additionally payment may be delayed from the time when product is received by the merchant in certain embodiments. Additionally any alternative B2B payment structure may be used that is capable of functioning in accordance with the embodiments of the innovations described herein.

Figure 5:
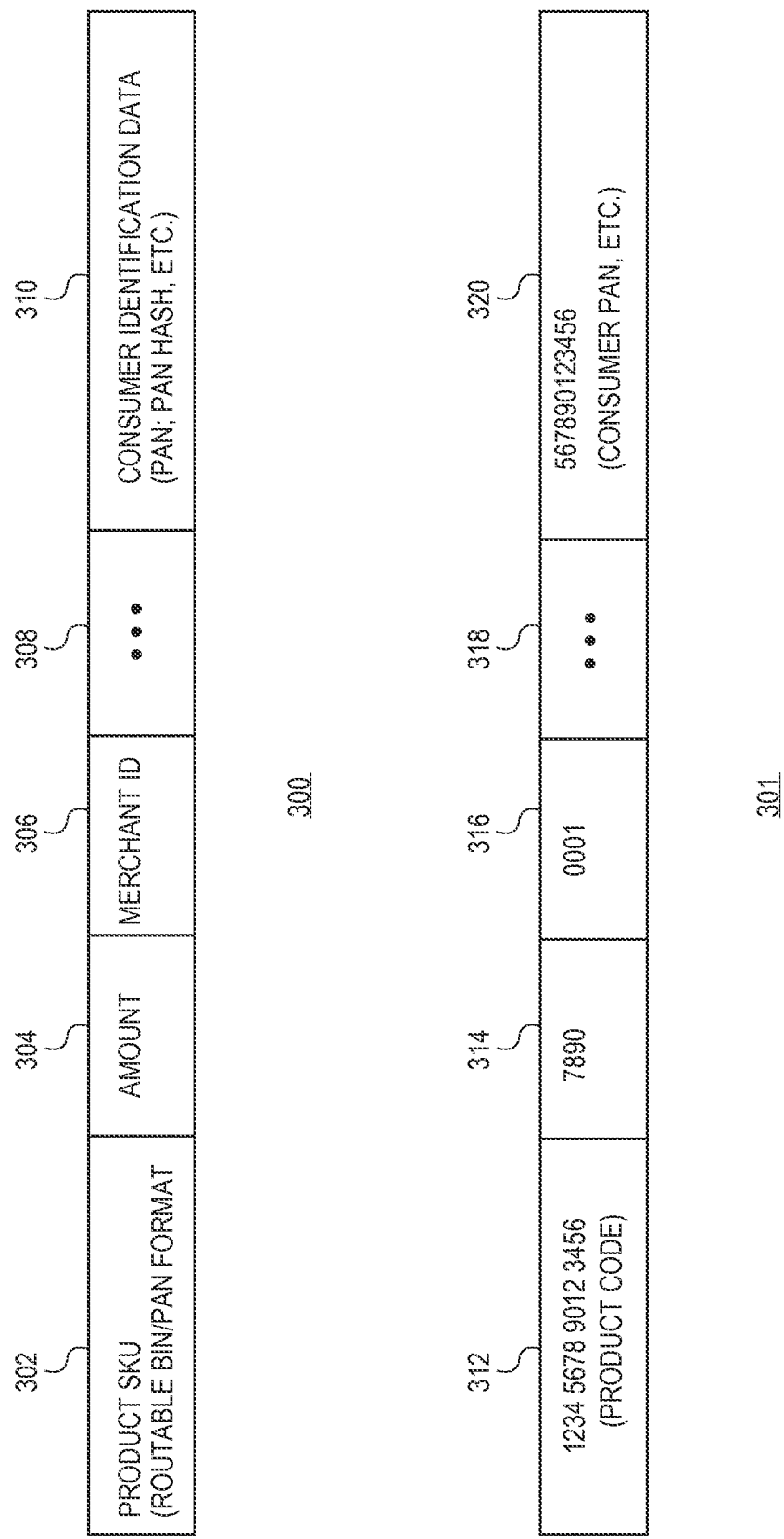
FIG. 5 is a diagram showing an example of data for use as part of one potential implementation of the innovations presented herein.
Figure 6:
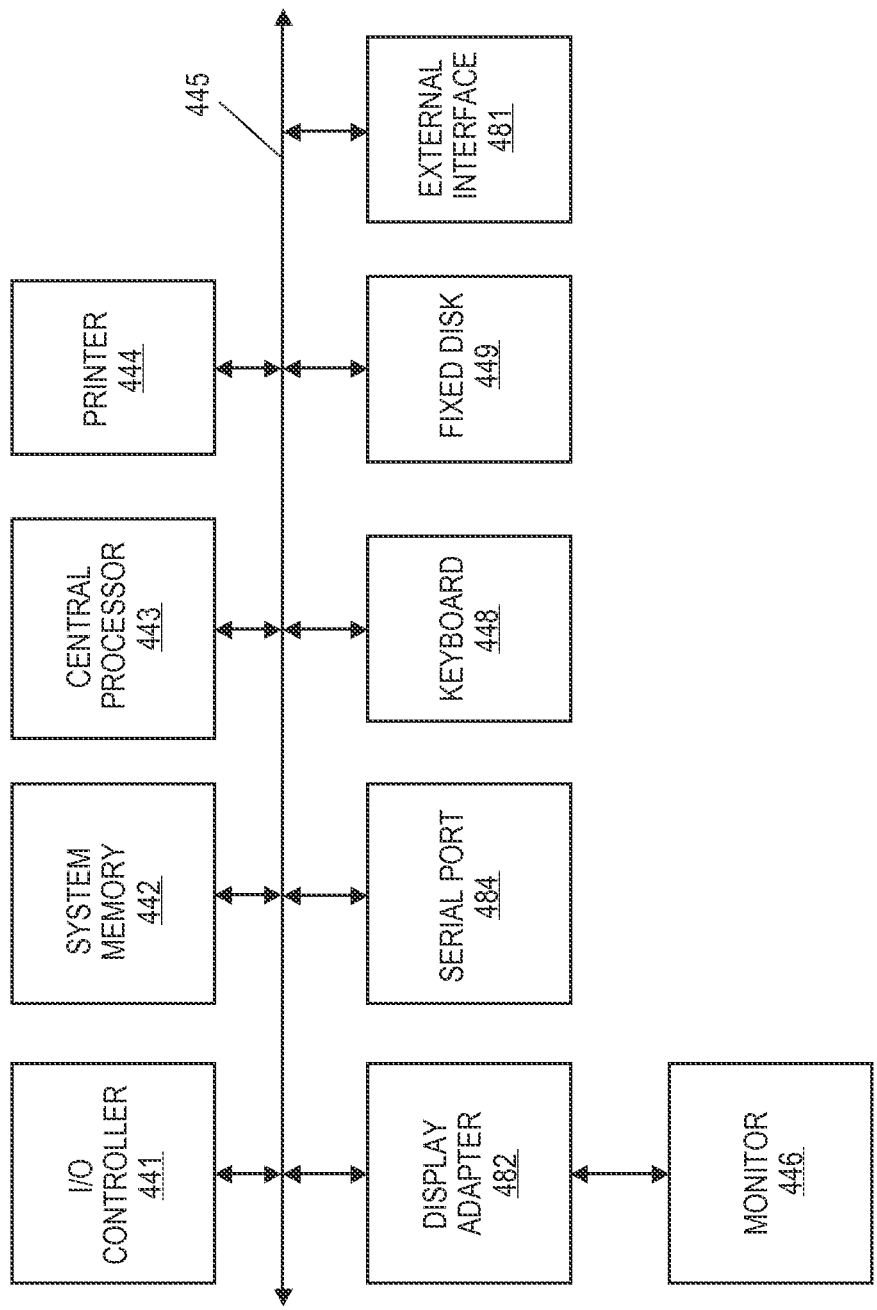
FIG. 6 shows a high level block diagram of a computer system that may be used to implement any of the entities or components described below according to an embodiment of the invention.

"Purchase data," as used herein, can refer to any information that relates to the purchase of a product or service involved in a proposed or actual transaction. Examples of transactional data may include a product identifier (e.g., stock keeping unit (SKU), universal product code (UPC)), product description, quantity, price, date and time, authorization response, and any other type of information related to the purchase of a product or service. Purchase data may be derived from authorization requests that are part of a purchase, and may also include merged data from other alternative sources such as inventory data. FIG. 5 provides one potential example of purchase data in accordance with an implementation of the innovations herein. FIG. 5 shows purchase data format 300 and purchase data 301. Purchase data format 300 includes the product SKU 302, amount 304, merchant ID 306, miscellaneous data 308, and consumer ID 310. Purchase data 301 includes example product code 312, example purchase amount 314, example merchant ID 316, misc. data 308, and consumer primary account number (PAN) 320. In alternative embodiments, other formats may be used. For example, a PAYMENT PROCESSING NETWORK may strip certain information from an authentication request to create purchase data which is forwarded to an analysis computer, or other custom formats may be created. Alternatively, track 1 or track 2 data in a credit card purchase may be used for identifying information that may comprise purchase data for use by an analysis system described herein.

"Inventory data" can refer to any information that relates to the quantity of a product on hand for sale by a merchant or supplier. This may include product available from a sales floor, a warehouse, or any other location available to a seller. This also may referred to available supply is of a service that may be provided which is limited by some restriction on a merchant or supplier ability to supply the service. In various embodiments, inventory and purchases data may be comingled.

"Database data" can refer to any data that is stored in a database. Examples of database data for the purposes of the present application include purchase data and inventory data aggregated in a database. Additional examples of database data may include product and merchant identifiers associated with sales volume, sales date, or sales price information. Database data may also include pay history of these types of data over time for use in, for example, tracking historical consumption of inventory and a merchant or supplier. This database data may also include projections for future consumption, pricing, or availability. The data may include information from any number of consumers, merchants, and suppliers. Database data may also include statistical analysis information that is derived from any of the above sources such as averages over time, comparisons between similar products and markets, and sales breakdowns by purchase type split among cash, credit card, or other payment types.

"Client data" may refer to data received from or associated with a specific merchant, supplier, or consumer that is a client of a vertical spend integration or processing system. Client data may include identifiers that allow a specific merchant or supplier to be associated with purchase data or inventory data, and may require heightened security or privacy considerations because of this identifying information.

"Market data" or "economic data" may refer to information that is included in a database that may be used to analyze supply, demand, or pricing for a particular product or a more general type of product. Market data may be derived from purchase data, but may have specific client, merchant, consumer, or supplier identifiers removed, especially for such parties that are not clients of an integration or analytics processing system, to address privacy concerns.

"Risk" as described herein refers to an expected likelihood or probability associated with a current or future event. In one potential embodiment, risk may be associated with a likelihood that a purchase order will be rejected or go unfilled due to insufficient inventory at a supplier requested to fill the purchase order. Additional types of risk may refer to a likelihood that a current transaction is fraudulent, or that a transaction is being presented by a business, person or device not authorized to engage in the transaction. In an alternative embodiment, risk may refer to a probability that a credit account will receive payment in the future for an amount advanced as part of a currently occurring transaction. In a further alternative embodiment, risk may refer to a possibility that a transaction result in a charge-back where an amount paid to a merchant must be returned from the merchant to a purchaser account.

As used herein, "analytics" can refer to the product of analyzing purchase data and/or operational data. In particular, analytics may include a variety of data such as statistical information regarding an analytics analysis of a merchant. Additionally, analytics may include information related to historical and future transactions, as well as data related to projected supply and demand. According to embodiments of the invention, analytics may be included in messages and/or alerts sent by the merchant timing system. "Supply chain analytics" then refers to analyzing data related to a supply chain, and/or projecting future supply chain effects based on analysis which may include supply and demand analysis. Analytics may further include analysis of data for calculation of various types of risks.

As described herein, "modules" may constitute either software modules (e.g., code embodied on a machine-readable medium) or hardware modules (e.g., electrical or mechanical circuitry or logic). Whether software or hardware based, modules can provide information to, and receive information from, other modules. Accordingly, the described modules may be regarded as being communicatively coupled. Where multiple of such modules exist contemporaneously, communications may be achieved through signal transmission (e.g., over appropriate circuits and buses) that connect the modules. In embodiments in which multiple modules are configured or instantiated at different times, communications between such modules may be achieved, for example, through the storage and retrieval of information in memory structures to which the multiple modules have access. For example, one module may perform an operation, and store the output of that operation in a memory device to which it is communicatively coupled. A further module may then, at a later time, access the memory device to retrieve and process the stored output. Modules may also initiate communications with input or output devices, and can operate on a resource (e.g., a collection of information).

A "payment processing network" such as payment processing network 114 can be a network of suitable entities that have information related to the account associated with consumer 102 and issued by issuer 116. This Information includes profile information and other suitable information that may be used to complete a transaction between consumer 102 and merchant 130 involving the account. Additional details related to a payment processing network will be described below with respect to FIG. 4.

Embodiments of the present invention may have a number of technical advantages. To begin, embodiments of the present invention can provide useful information to the supply chain without requiring specialized systems to be implemented within each supply chain participants, thereby creating a more efficient use of networked computer resources in a supply chain. For example, by simply using an inventory system that manages the merchant's inventory levels and the payment facilities for performing commercial transactions between buyers and sellers, a payment processing network can provide the information described above, such as inventory demands, risks of non-fulfillment, and pricing information. As such, the suppliers do not each have to develop or deploy relatively complicated enterprise resource planning systems, as are typically used by large businesses, nor do the merchants and suppliers need to integrate sophisticated systems. Further, a standardized system may provide improved reliability in computer based transactions between businesses, by leveraging a payment processing network that may process thousands of transactions per second with extremely low error rates, and typically replacing custom business to business networks with less reliability. Similarly, by integrating with payment processing networks that are widely accepted and used, custom network interactions between specific businesses are replaced by standardized integrated network computing systems that promote interoperability and network speed.

Further, embodiments of the present information may be comparatively safe in that the information is routed through a payment processing network, such as Visa, rather than integrated in a common platform, such as an enterprise resource planning system. Integrating information into an additional system may expose an access point in which a fraudster may obtain sensitive information. For security reasons, some businesses may make a business decision to not share supply chain information.

Still further, embodiments of the present information may be comparatively reliable in that the supply chain analytics is based on information tied to transaction or purchase data. By being tied to financial transactions, the information may be more difficult and costly to fake.

a. Generating Estimates for the Demand of Inventory

Embodiments of the present invention can estimate the demand for products or goods using the information received from the consumer transactions and commercial transactions. To illustrate such an estimate, consider a computer supply chain. In such an embodiment, the payment processing network 114 can generate an estimate for the demands of various computer parts (e.g., keyboards) based on computers sold at computer retail stores.

To relate a consumer product with its corresponding parts, the payment processing network 114 can have a database that relates the SKU number of a computer to a part of the computer, such as a keyboard. Such information can be provided to the payment processing network 114 via the inventory system 112 associated with the merchant 104.

When a consumer 102 purchases a computer from the merchant, the payment processing network 114 receives the consumer purchase data and a product identifier (e.g., a SKU) associated with the computer. The payment processing network 114 can then determine, using the relationship between the computer and its corresponding parts, that the merchant's keyboard inventory has also been consumed. By aggregating consumer purchases of computers, optionally from multiple merchants, the payment processing network 114 can then generate an estimate of demand for keyboards that is needed to restock the merchant's keyboard inventory level. Such information can be sent to the supplier of the keyboard. Such information can also be sent to the supplier that provides the keyboard manufacture its parts.

b. Generating Alerts of the Risk that a Supplier May Not Meet the Demand for a Good Embodiments of the present invention can alert a merchant (or other party within a supply chain) of a risk that a supplier will be unable to meet the estimated demand for a good that the merchant buys. To illustrate such an alert, consider again the example computer supply chain described above. In such an embodiment, the payment processing network 114 can generate an alert of the risk that a need for a keyboard will not be met based on the commercial purchases of keyboard parts made by the keyboard supplier in light of the computers purchased at the computer retail store.

For example, as described above, the payment processing network 114 can estimate the demand for keyboards using the consumer purchases of computers at the retail store. In addition to estimating the number of keyboards needed to replenish the computer retail store's inventory of keyboards, the payment processing network 114 can also observe the number of keyboard parts purchased by the keyboard supplier. With the estimated demand for keyboards and the number of keyboard parts purchased, the payment processing network 114 can determine if the keyboard supplier has purchased enough keyboard parts to fulfill the retail store's demand for keyboards. If not, the payment processing network 114 can alert the retail store or any other entity of the risk.

In some embodiments, the payment processing network 114 can determine that a supplier lacks enough supplies to produce a good that is needed by a buyer by tracking the inventory of the supplier. As one example, the purchase orders and invoices transmitted as part of the commercial transactions described above may include product identifiers for the parts or resources needed to supply a good to a buyer. In this way, the payment processing network 114 can track the resources coming into the supplier and the output leaving the supplier. Based on this, the payment processing network 114 can, for example, estimate the number of power cords needed to produce a keyboard. The payment processing network 114 can then compare the estimated need for keyboards with supply level of power cords at the keyboard supplier. If the supply level for power cords would not meet the demand for keyboards, the payment processing network 114 can then alert a buyer (e.g., a merchant or another supplier).

In other embodiments, the payment processing network 114 can consider the demands across multiple buyers that a supplier deals with. A relationship between the supplier and the buyer can be determined through the purchase orders and invoices processed by the payment processing network 114. For example, the invoices can include a buyer identifier associated with the buyer and a seller identifier associated with the supplier. Thus, the payment processing network can match all the buyers purchasing goods from a supplier. Using this aggregated information, the payment processing network 114 can in addition consider whether the supplier can not only meet the demand for inventory but also the demand from the various merchants purchasing goods (e.g., keyboards) from the supplier.

In another embodiment, the payment processing network 114 can consider the goods moving at any point within the supply chain. For example, for the computer retail store, the payment processing network 114 can also consider the goods being purchased by the power cord manufacturer. Such information can be useful to determine whether the keyboard manufacturer will be able to even purchase enough power cords to satisfy the demands for computers.

c. Sending Pricing Information Regarding Goods to Merchants

Embodiments of the present invention can be configured to provide pricing information regarding goods or services being purchased within the supply chain. To illustrate such pricing information, consider again the example computer supply chain described above. In example embodiments, the payment processing network can send pricing information (e.g., average price) regarding keyboards to retail stores based on commercial transactions between the multiple keyboard suppliers and multiple computer retail stores.

To provide such pricing information, the payment processing network can aggregate commercial transactions involving keyboards. In some embodiments, the payment processing network can aggregate commercial transactions involving keyboards by searching for keyboard purchase orders or keyboard invoices exchanged between the buyers and sellers through the payment processing network. A purchase order or an invoice can be associated with a keyboard if the purchase order or invoice includes an identifier associated with a keyboard or, in some embodiments, the language that indicates a keyboard.

Once the payment processing network aggregates the relevant consumer transactions, the payment processing network can provide various types of information as it relates to the pricing of keyboards. For example, the payment processing network can provide an average price paid per unit, a price paid for orders under 100, lowest price paid, highest price paid, largest supplier, largest buyer, etc. In some embodiments, the pricing information does not identify the parties involved in the transactions.

d. Sending Pricing Information to Consumers

Embodiments of the present invention can be configured to provide pricing information to a consumer before the consumer purchases an item from a merchant. To illustrate such pricing information, consider again the example computer supply chain described above. In example embodiments, the payment processing network can send pricing information (e.g., average price) regarding computers to consumers based on consumer transactions between consumers and the one or more computer retail stores.

To provide such pricing information to consumers, the payment processing network 114 can aggregate consumer transactions involving computers. In some embodiments, the payment processing network 114 can aggregate or filter for consumer transactions involving a specified product identifier (e.g., a SKU). As described above, the product identifier can be transmitted to the payment processing network 114 as part of the payment transaction or by a message sent by the merchant's access device.

Once the payment processing network 114 aggregates the relevant consumer transactions, the payment processing network 114 can provide the consumer with information regarding the price of a product. For example, in an embodiment, the portable consumer device may be a mobile phone running an application capable of sending a price request to the payment processing network. The price request can include a product identifier associated a product or service offering of the merchant. In response to receiving the price request, the payment processing network 114 can calculate pricing information from the relevant consumer transactions. For example the payment processing network 114 can calculate the average price paid for the product, a lowest price paid, the highest price paid. In certain embodiments, the payment processing network 114 can provide information regarding specific merchants that, for example, are offering the product for a lower price.

II. Vertical Computing Integration, Analytics, and Automation and Analysis System FIG. 1 shows one illustrative embodiment of a system that includes vertical spend integration and processing in accordance with one potential embodiment of the innovations presented herein. FIG. 1 includes consumers 102, merchant computers 104, acquirer computers 110, inventory system computers 112, supplier computer 106, payment processing network 114, supplier integration and analysis computer 113, and issuer computers 116. FIG. 1 also shows illustrative communications between various parts of the system including authorization requests 142, inventory data 130, purchase data 138, messages 114, data 144, and business to business (B2B) payment data 146.

In such a system product identifier information may be sent to payment processing network 114 as part of an authorization request 142 during a sales transaction by a merchant 104. Authorization data, may include a product identifier and a merchant identifier, and in this alternative way, payment processing network 114 or the analysis computer 113 can then correlate the product purchased by the consumer with the purchase data received through the typical consumer financial transaction. In the embodiment shown in FIG. 1, details needed by analysis computer 113 received at payment processing network as part of authorization request 142 are forwarded from payment processing network 114 to analysis computer 113 as purchase data 138.

Thus, a supply chain allows the consumer 102 to purchase a product or service from a retail store associated with a merchant computer 104. The product or service purchased from the merchant associated with a merchant computer 104 is usually provided in part by a supplier 106. For example, the supplier 106 may be a keyboard manufacturer and the retail store may be a computer retail store. Thus, when a consumer purchases a computer, the inventory for keyboards maintained by the retail is reduced by one. Thus, the purchase of the product by the consumer 102 consumes inventory held by the retail store 104. As is explained below, the inventory system 112 manages and tracks the inventory levels of the retail store 104.

FIG. 1 shows supplier integration and analysis computer, or analysis computer 113, as separate from payment processing network 114. In certain embodiments, analysis computer 113 may be run as a separate system or computing device from payment processing network 114. In alternative embodiments, analysis computer 113 and payment processing network 114 may be integrated, such that analysis computer 113 operates from within payment processing network 114.

Certain merchants may not enroll in an analysis system, and may not integrate inventory and supplier information into the system. In FIG. 1, merchant computer 104a sends data through payment processing network 114, but is not structured to send inventory data to analysis computer 113. Purchase data that may originate from authorization request 142a via merchant computer 104a may still be used by the system to create market, normalization, and other analytics results in conjunction with other data. This data may be stripped of merchant or consumer identifying information to address privacy concerns, but information related to sales price, date, and/or product ID may still be used by analysis computer 113.

Similarly, while some merchants such as a merchant associated with merchant computer 104b may couple inventory system computer 112b to analysis computer 113, some or all of the inventory system computers of the suppliers for merchant 104b may not be coupled to analysis computer 113. Analysis computer 113 may therefore offer certain functionality to inventory system computer 112b but not other functionality that uses data directly acquired from a supplier inventory system computer, such as automated purchase orders or invoice payment.

Other merchants, however, such as a merchant associated with merchant computer 104c may be part of a supply chain that is vertically integrated with suppliers such as the supplier associated with first supplier computer 106 via the analysis computer. Fully integrated supply chains such as one shown by inventory system computer 112c and inventory system computer 112d, which are associated with merchant computer 104c and first supplier computer 106 respectively, may enable additional supply chain analytics functionality, as will be described in more detail below.

Therefore, while certain merchant computers and merchant inventory systems may not be integrated with supplier integration and analysis computer 113, data from those systems may still be used to increase the reliability and thoroughness of the analytics analysis performed by analysis computer 113. In various embodiments, supplier computer 106, merchant computer 104c, inventory system computer 112c, inventory system 112d, and analysis computer 113 may communicate with each other in any order or in direct communication of any supply chain computer to enable any functionality described herein.

An inventory system 112 such as inventory system 112a tracks the inventory levels of goods stored by a particular merchant or group of merchants. In FIG. 1, inventory system 112a tracks the inventory of the merchant associated with merchant computer 104b, inventory system 112c tracks the inventory of the merchant associated with merchant computer 104c and inventory computer 112d tracks the inventory of the supplier associated with first supplier computer 106. Although FIG. 1 shows the inventory system 112a as a system outside of the merchant computer 104b, other embodiments may include an inventory system hosted by or integrated with merchant computer 104b. In some embodiments, an inventory system 112 allows the merchant to link products sold to the consumer to the goods held in inventory. In some cases, a single product may link to a single good in inventory, such as car. In other cases, a single product may link to a number of goods, such as meal sold at a restaurant may be linked to an ingredient list. In other cases, a single product may link to a fraction part of a good, such as a six pack soda may link to a case of soda.

An inventory system can, in some embodiments, automatically generate purchase orders of goods when the selling of a product causes the inventory of a good to meet a threshold minimum limit. The inventory system may, in some embodiments, can then send the purchase order to the ordering systems of an appropriate supplier. Further, the inventory system can allow the merchant 104 to electronically settle these invoices. Still further, the inventory system can provide data feeds to the suppliers to monitor the inventory at the small business.

As FIG. 1 shows, an inventory system computer 112 can provide inventory data 130 which may include product identifiers (e.g., SKUs) to an analysis computer 113. For example, when a consumer purchases a product at the merchant 102, the inventory system 113 can send the product identifier and a transaction identifier to the analysis computer 113 as part of an update of inventory data 130b. In this way, the analysis computer 113 can then correlate the product purchased by the consumer with the purchase data received through the typical consumer financial transaction.

Once the analysis computer 113 receives the consumer purchase information, including product identifiers, and information from the commercial transactions between the buyers and suppliers, the payment processing network can generate a number of supply chain analytics. The following method examples further below are provided to illustrate the types of analytics the payment processing network may generate. In the example, a computer supply chain is described. It should be appreciated that such a supply chain is provided merely as an example and used merely for illustration. Accordingly, the computer supply chain has been simplified to clarify the concepts and actual computer supply chains implemented in commercial practice may differ from the example in any number of aspects.

In certain embodiments, inventory system computer 112 may comprise an HTTPS server with HTTPS connector functionality for communicating with cXML over HTTP network connections. Such an HTTPS server may function to create merchant initiated purchase orders, and to receive electronic invoices from suppliers. In alternative embodiments, such a server may be used to interface with supplier integration and analysis computer 113 and to set analytics thresholds for automated creation of purchase orders and invoices responses.

Similarly, in certain embodiments, a supplier integration and analysis computer 113 may comprise an HTTPS server which receives and sends communications in C XML over HTTP using an HTTP S connector. The supplier integration portion of computer 113 may include a processing engine for communicating purchase orders and invoices between merchants and suppliers, or for automated creation of these orders and invoices in response to client selected analytics automation. For administering such analytics automation, the HTTP S server may further include administrative processing modules for receiving instructions from clients related to processing and executing integration of supply chain computing resources. In addition to facilitating C XML over HTTP communications, supplier integration and analysis computer 113 may also include other standardized working communication protocols such as FTP or standardized e-mail formats such as a simple mail transfer protocol (SMTP), and may further interface with older systems using native flat file formats or translation protocols for interfacing with older custom client computing systems. Use of HTTP as an e-mail/SMTP may provide improved security for network supply chain computing integration that is standardized to provide supply chain wide security improvement.

In addition to the above described supply chain, embodiments of the present innovations may function with a Merchant Direct Exchange platform service (MDEX), which is geared toward high-volume merchants and includes both authorization processing and file transfer capabilities. Using a single Internet-based protocol (IP) connection from the merchant (or the inventory system) to the payment processing network (e.g. VisaNet), MDEX accepts and routes authorizations for all card and transaction types. For instance, if the payment processing network was Visa, both Visa and non-Visa transaction could be routed by Visa to the appropriate card association or company for processing. This results in merchants only needing to support one message format (e.g. Visa ISO 8583). The payment processing network would provide any necessary translations. While not illustrated in FIG. 1, the embodiment of FIG. 1 may be coupled to such a system through analysis computer 113, an inventory system computer 112, a merchant computer 104 or a supplier computer 106 for high volume authorization processing.

Furthermore, through a point-to-file service (PPFS), merchants may be able to securely transfer proprietary, payment-related data to other MDEX endpoints 24 hours a day, eliminating the need for multiple connections. For example, a merchant can send its end-of-day clearing files to its acquirer or can send its rewards data to its clearinghouse. Still further, a merchant can send its inventory data or purchase data matched with product identifiers to the payment processing network.

In one embodiment, two separate circuits and two carriers can be used to provide additional reliability, where both can be configured to handle 100% of the merchant's projected volume. If one circuit experiences problems, all the traffic can be moved to the other circuit/carrier, without any degradation in service quality.

III. Analysis Computer

Figure 2:
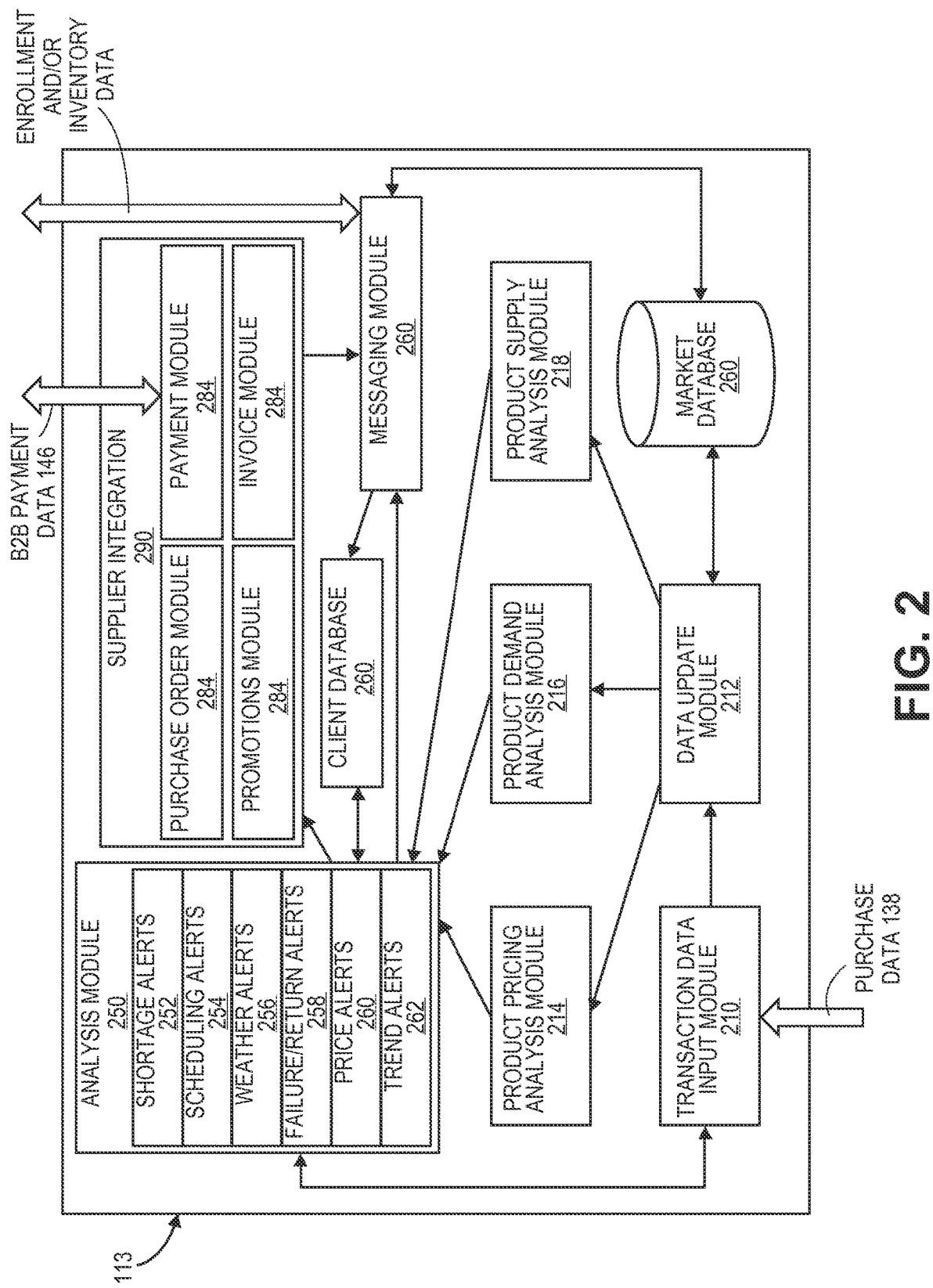
FIG. 2 is a diagram showing an example analysis computer for use as part of one potential implementation of the innovations presented herein.

FIG. 2 describes one potential implementation of a supply integration and analysis computer in accordance with one potential embodiment of the innovations presented herein. As described above, in certain implementations, an analysis computer as described by FIG. 2 may be integrated with a payment processing network, while in other implementations, an analysis computer similar to that described in FIG. 2 may be implemented separately from a payment processing network with a network coupling (i.e. via the Internet) to a payment processing network.

The analysis computer 113 may generate supply chain analytics relating to an analytics analysis of a merchant or a supplier of the merchant, or to pricing information that may be provided to a consumer.

Supplier integration and analysis computer 113 includes purchase data input module 250, data update module 212, product pricing analysis module 214, product demand analysis module 216, product supply analysis module 218, analysis module 210, promotions module 284, purchase module 280, invoice integration module 282, and messaging module 260. Analysis computer 113 may further include market data database 260 and client data database 270. Further still analysis computer 113 may have integrated modules for small business verticals spend integration. Such modules may include purchase order module 280, invoice integration module 282, payment module 286, and/or promotions module 284.

As described above, payment module 286 or other modules may be coupled with a Merchant Direct Exchange platform service (MDEX), which is geared toward high-volume merchants or to aggregated payments from multiple clients that are automated using analysis computer 113 as described in more detail below.

In various embodiments, market data database 260 and client data database 270 may be integrated into a single database. Market database 260 may include data not directly associated with a client, or even with a particular product sold by a client of the analysis system. Market database 260 may include a broad range of data that is relevant to product demand in directly, but may nevertheless be used for supply chain analytics relevant to a client merchant, supplier, or consumer. Client database 270 by contrast, may include data directly related to a particular client such as current merchant inventory levels, current supplier inventory levels, or special client related thresholds/rules that determine when messages will be created for a particular client.

Purchase data input module 250 may function to route purchase data derived from authorization messages. When this data is first received from the payment processing network, purchase data input module 250 may analyze the purchase data to determine if it is related to a specific client, related generally to a product or market relevant to a client, or not relevant to any part of the analysis system. Irrelevant data may be discarded or stored for potential future use.

In certain embodiments purchase data and or inventory data may come directly from a merchant or supplier to analysis computer 113. In contrast to purchase data which is received from payment processing network at purchase data input module 250, data directly from a client may be received at messaging module 260. This may include inventory data 130 as described in FIG. 1, or any other data directly from a client of the system. Messaging module 260 may forward this data to purchase data input module 250 or may route the data to the appropriate database.

Various modules of analysis computer 113 may use the data from market data database 260 and client database 272 create supply chain analytics. Such analytics may be created in response to a specific request received from a client at messaging module 260 or may alternatively be created as part of a regularly scheduled analysis, or by any other acceptable means. Data update module 212 may retrieve the appropriate data from market database 260 for use in creating specific analytics. Different data from market database 260 may be used for different analyses performed by product pricing analysis module 214 product demand analysis module 216 or product supply analysis module 218. The analysis from each of these modules may then be forwarded to analysis module 210 and combined with client specific data to create specific messages for a client. For example analysis module 210 may perform analysis resulting in shortage alerts 252, scheduling alerts 254, weather alerts 256, failure/return alerts 258, pricing alerts 260, or trend alerts 262.

The analysis module 210 may generate analytics relating to an analytics analysis of a client merchant, supplier, or consumer. As described above, an analytics analysis may be any information that relates to the operations of a merchant, such as information related to inventory or staffing. In example embodiments, the generated analytics may include merchant timing information that show a pattern of demand for the analytics analysis. Such patterns enable a merchant to better manage the analytics analysis, such as providing relative timing and degree of the demand on the analytics analysis. To generate analytics, the analysis module 210 may receive or otherwise have access to a large amount of data via market data database 260. The analytics module 210 may then generate information regarding a market for a product greater than the product information directly associated with any particular merchant or supplier.

In one potential example, the analysis module 210 may provide "just in time controls" for the merchant. Such controls may send an alert message to the merchant that indicates that available inventory from known suppliers for a particular product is at and/or below a threshold limit. Based on receiving the alert message, a representative for the merchant may then make an actionable business decision, such as to restock the inventory of the particular product. To provide just in time controls, the analysis module 210 may receive or otherwise have access to inventory information for a merchant and at least a portion of the merchant's suppliers. In certain embodiments, such alerts may be based only on information from known suppliers. In alternative embodiments, the analysis module may project overall marketplace availability for products based on information from known suppliers. Such inventory information may provide information regarding specific types of products, such as an identifier, number of units in stock, price, freshness period, cost for storage, or any other information relating to the product. Such merchant controls may also include a threshold point that indicates when the merchant would like to receive an indication from the messaging module that the merchant should consider restocking inventory for the product. In addition to using inventory information received directly from merchant and supplier inventory computers, the analysis module 210 may use periodic updates to estimate a number of units of the product that remain stocked by the merchant by observing transactional data that is processed by a payment processing network and estimating transactions that do not pass through the payment processing network. Based on a comparison between the estimated units remaining and a threshold point, the analysis module 210 may create analytics related to the inventory of the product. Such analytics may recommend or provide information that allows the merchant to restock the particular item.

In another embodiment, the analysis module 210 may generate information relating to an analytics analysis of a merchant using transactional data of another merchant. The analysis module 210 may determine that the other merchant is somehow similar to the merchant. This determination may be made by comparing merchant category codes included in the transactional data. In other embodiments, the analysis module 210 receives an external indication that the other merchant is similar to the merchant. For example, a representative may communicate with the merchant timing system to indicate that the transactional data from the other merchant should be used in generating the information relating to the operational aspect. The analysis module 210 may generate the information relating to an operational aspect based on merchants in similar or same geographic area. Similarly, analysis module 210 may identify groups of products that, while having different product identifiers, may be related based on product type or based on identified properties as being substitutable or related for one another.

An advantage of using purchase or transaction data from another merchant to generate the information relating to an analytics analysis is that the purchase data for the other merchant may be comparatively complete than data from the merchant. Such may be the case where the merchant is determining the effects of running a promotion similar to a promotion that the other merchant runs. Such may also be the case where the merchant is a relatively new business and, as a result, lacks a history of transactions. In the new business case, the analysis module 210 may generate the information relating to an operational aspect based on the time period where the other merchant was similarly considered a new business.

To generate analytics described herein, the analysis module 210 may analyze various information from the purchase data to determine the product or service sold by a merchant and to determine whether the transaction is relevant to a particular merchant. In some embodiments, the analysis module can determine the product sold based on a stock keeping unit (SKU) data included in the purchase data. In other implementations, the products sold can be determined based upon the merchant (MCC or MW), time and date of the transaction, or other factors. For example, a sale at a fuel station pump can be categorized as a gasoline sale.

Product pricing analysis module 214, product demand analysis module 216, and product supply analysis module 218 may essentially generate economic forecasts that may be generally or specifically targeted to a particular merchant or product. "Economic forecasts" or "market forcasts" as used herein can refer to a prediction of an economic property that relates to or otherwise characterizes part or all of an economy, or tailored to general demand for a product or type of product at all merchants that sell the product. In one embodiment, these modules may produce models of the economic property using numerical time-series, e.g. sets of data (covering periods of time such as monthly, quarterly, annually, or any other time period) for part or all of an economy, and may integrated data such as major components of Gross National Product, Gross National Expenditure, Gross National Income, and data series including output, orders, trade, confidence, prices and financial series (e.g. money and interest rates). At the international level there are many series including international trade, international financial flows, direct investment flows (between countries) and exchange rates that may be integrated and impact potential supply or demand related to products.

These modules 214-218 may further use any number of methods for generating economic forecasts. Some embodiments may use multiple regression, Box-Jenkins analysis, seasonality analysis. Other embodiments may use univariate (forecasting from one series) or multivariate (forecasting from several series) techniques, and may build economic models based on economic data, adjusted economic data, and relationships with other data, to generate economic forecasts.

Further, these modules 214-218 may use market wide reports, supplier media reports, and/or inventory level changes to adjusts information in client database 270 to account for secondary effects. "Secondary effects" as used herein can refer to fluctuations in the number of transactions observed by the merchant timing system that are independent of whether or not actual consumption is similarly fluctuating. One specific example of a secondary effect is a consumer trend towards making purchases with a payment card (e.g., credit, debit, and prepaid cards) and away from making purchases with cash. As a result of such a shift in consumer behavior, it is possible for the payment processing network 114 to process an increasing number of transactions without the total number of transactions processed by the merchant also increasing.

Another specific example of a secondary effect is when a financial institution (e.g., an issuer), or a provider of a payment processing network, sells or purchases a portfolio of accounts associated with consumer devices. In such situations, the number of transactions observed by the merchant timing system depends on which payment processing network associated with the consumer device used to process the transaction. In such situations, the number of transactions observed by the merchant timing system depends on which payment processing network associated with the consumer device used to process the transaction.

As described below, the analysis computer 113 may use any number of methods for adjusting data. For example, as described below, some embodiments may estimate the proportion of purchases conducted by the merchant that are processed by the payment processing network.

The messaging module 260 may function to generate or cause the generation of a message to be sent to a merchant computer 104. The message may include information regarding analytics analyses of the merchant, such as the current level of inventory, a recommendation to purchase additional products, a recommendation to hire or otherwise staff additional employees. In some embodiments, messaging module may include, be part of, or be in communication with one or more communication channels to enable the delivery of a message or messages to the merchant. Alternatively, as described above, any portion of activities related to purchasing or similar actions may be automated within modules of analysis computer 113.

Additionally, for any portion of a supplier relationship that is automated, electronic approval processes and messages may interrupt the process. For example, analysis computer may automatically create an order or an invoice, but an electronic approval may be required before the order is transmitted to a supplier or before an invoice is sent to a merchant along with product. Such approval interrupts may also be managed by analysis computer 113 using messaging module 260.

IV. Methods

Figure 3:
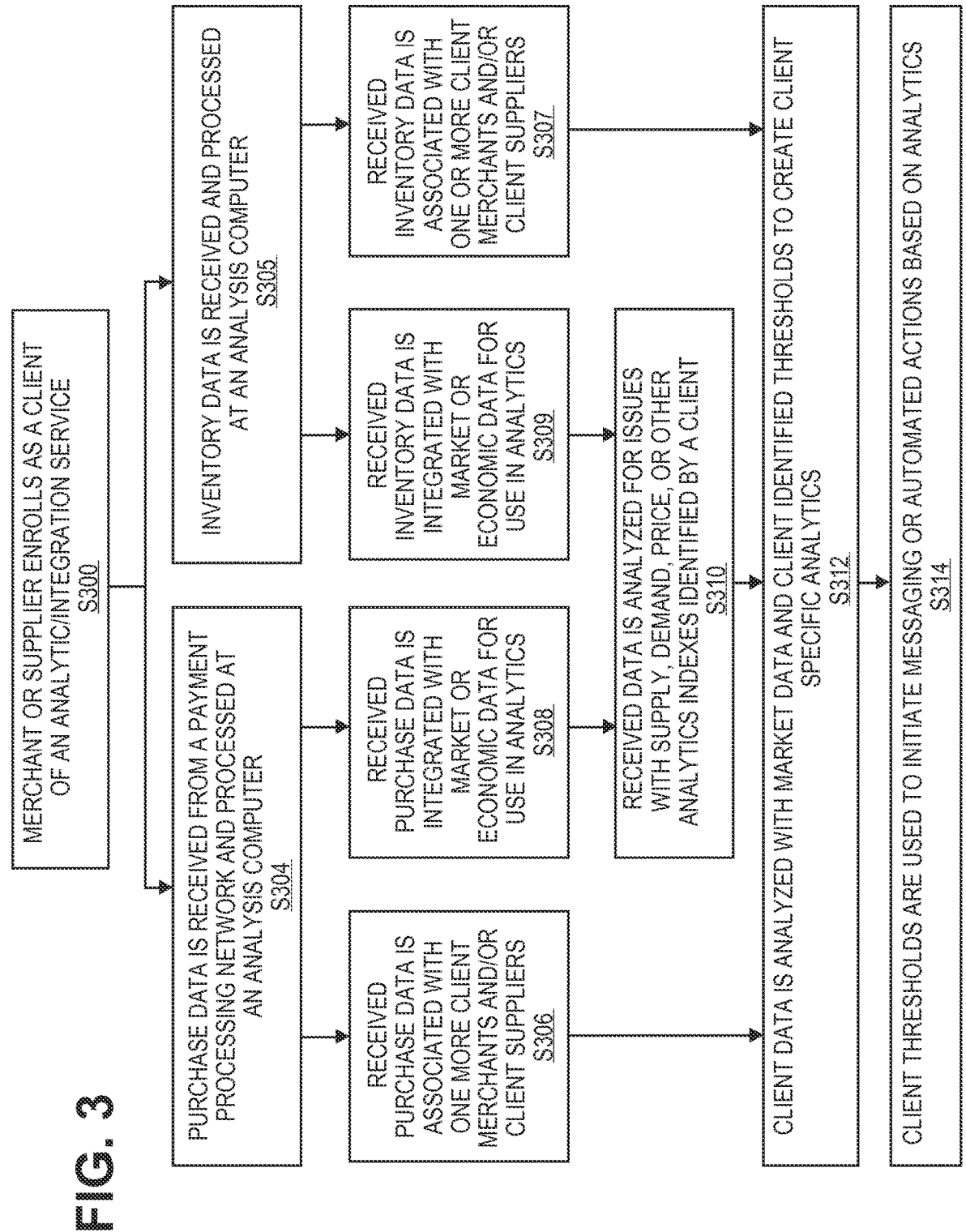
FIG. 3 is a flowchart describing one potential method of small business vertical spend processing in accordance with one potential implementation of the innovations presented herein.

FIG. 3 describes one potential method of using the systems of FIG. 1 with the analysis computer of FIG. 2 for vertical computing integration, analytics, and automation. This is illustrated via a flowchart of a first embodiment of a process that begins with enrolling a merchant into the analysis engine, continues to processing purchase data, then on to analyzing transactional data, and finally to reporting analytics and/or analytics automated actions or recommendations. The method 300 can be performed, for example, by analysis computer 113 of FIG. 2 or by the payment processing network 114 of FIG. 1, as described above. The payment processing network 114 performing a method, such as the method 300 or some other method, may use one or more computers or network of computers to perform some or all of the acts within the method or alternatively, some of the steps may also be performed manually by a person interacting with a computing device.

As shown in FIG. 3, the merchant computer 104 or supplier computer 106 enrolls in the service provided by the vertical computing integration, analytics, and automation system (operation S302.) A transaction then occurs (operation S304) and purchase data from the transaction is received at analysis computer 113. At analysis computer 113, the purchase data is categorized related to specific service clients (operation S306) and broader market or economic data (operation S308.) At different times, inventory data may be received directly from a client at analysis computer in operation S305. Similar to operations S306 and S308, this inventory data may be integrated with client specific data in operation S307 and integrated with a market data database in operation S309. In operation S310, broader market data is analyzed to create pricing, demand, and/or supply data, and this is supplied to analysis module 210. In operation S312, client specific data is analyzed with broader market data and used to created analytics, messages, or automated actions for specific clients in step S314.

As part of enrollment operation S302, data that the merchant computer 104 provides during the enrollment process is then sent to the client database 270. Additionally, portions of the enrollment data may be incorporated into market data database 260 for broader analysis and analytics. Further, in some embodiments of the present invention, the merchant computer 104 may enroll for the analytic service provided by the analysis computer 113 through multiple ways. Although this patent application describes the enrollment process using a merchant, it should be understood that any person or entity can request or use the analytic services. In some embodiments, a consumer may enroll for pricing updates or inventory alerts. In some embodiments, the payment processing network 114 may provide the analytic service as an option to the merchant computer 104 at which time the merchant computer 104 may enroll in the analytic service either by contacting a customer service representative over the phone (provided, for example, the payment processing network 114), or by accessing a web site and filling out an online application. In certain embodiments, the web site may be hosted by one entity but can redirect the merchant computer 104 to a site hosted by another entity.

During the enrollment process, the merchant computer 104 may provide information that will be used by the analysis computer 113 during the processing of the purchase data, and potentially to create structures for analysis of a product important to the client that will be used to process data from other alternative sources for storage in market data database 260. The merchant computer 104 may provide the information to the analysis computer 113 by accessing a website and filling out an online application or by contacting a customer service representative (e.g., using the phone). The merchant computer 104 may later access the web site or contact a representative to change the information provided at any time. The merchant computer 104 may also send such information to the analytics system via a web service and/or an application programmable interface (API) provided by analysis computer 113.

Information provided by the merchant computer 104 may include supply chain information so that analysis computer 113 may identify data associated with the client and linkages between the client and other clients and suppliers with data already in the system. In particular, the merchant computer 104 may provide information including web service identifiers (such as account user names) and merchant identifiers that may be present in authorization messages passing through payment processing network 114. The merchant computer 104 may further provide user device characteristics information such as make and model information for any products that are important to the merchant or that are associated with analytics.

The merchant computer 104 may additionally provide information about the analytics he or she wants to be enabled or have checked when a transaction is received by the analysis computer 113. The merchant computer 104 may further provide criteria for conditions that should trigger the analytics system to send a message to the user regarding the analytics analysis. For example, the merchant computer 104 may specify "just in time controls" that notify the merchant computer 104 when certain actions need to be made regarding an analytics analysis. The merchant computer 104 may also configure settings to delay or prevent the generation and sending of certain messages.

In addition to enabling analytics, the merchant computer 104 may provide operational data to the analysis computer 113. In particular, embodiments of the invention may set initial status data that characterizes the current values of one or more analytics analyses relative to the user. As a specific example, the merchant computer 104 may provide current status of inventory, such as a list of products offered by the merchant, identifiers (SKU, UPC, or any other identifier), number of items for each of the products, descriptions of the products, expected lifespan of the data, etc.

The information that the merchant computer 104 provides is stored in the client database 270. Alternatively or additionally, in some embodiments, some or all of this information may be stripped of association with the particular client and included in market data database 260 so that it may be used in analysis for other clients.

Operation S304 in FIG. 3 involves a purchase transaction which was described previously. In one potential purchase transaction that may operate in conjunction with a system of vertical computing integration, analytics, and automation, a consumer purchases goods or services at the merchant computer 104 using the portable consumer device. An authorization request message comprising purchase data is generated by a processor in the access device after the portable consumer device interacts with the access device. The authorization request message may comprise, for example, the BIN (bank identification number) and expiration date associated with the portable consumer device, the purchase amount, date of transaction, time of day of transaction, a merchant code such as a merchant category code (MCC), and a merchant identifier such as a merchant verification value (MW). An example of an authorization request message that may function in accordance with certain embodiments of the present innovations is more particularly shown in FIG. 5. As a result of this transaction, the analysis computer receives purchase data, which may be any relevant or even partial portion of the data, of which FIG. 5 shows one example.

In some embodiments of the present invention, the analysis computer 113 may obtain purchase data through multiple ways as part of operation S304. In some embodiments, if the merchant computer 104 is enrolled in the analytic service, the payment processing network 114 may only send the purchase data associated with the merchant to the analysis computer 113 if authorized. In order for the payment processing network 114 to determine whether the authorization request is associated with an appropriate merchant computer 104 that is enrolled in the analytics service, the payment processing network 114 maintains a list of merchant verification values associated with merchants who are enrolled in the messaging service in an enrollment database (not shown).

In other embodiments, the payment processing network 114 does not determine whether the transaction is associated with a merchant computer 104 enrolled in the analytics service. Instead, the payment processing network acts as a pass-through that automatically sends purchase data to the analysis computer 113. For example, the payment processing network 114 transmits at least some portion of the purchase data to the analysis computer 113 as part of processing the authentication request. Alternatively, the payment processing network 114 can send purchase data to the analysis computer on a periodic basis.

In any of the above embodiments, the analysis computer receives a portion of purchase data received by the payment processing network 114. However, in some example embodiments, the analysis computer 113 may receive purchase data from the merchant computer or merchant inventory system computer directly, along with inventory data, as shown by inventory data 130 of FIG. 1. Such may be the case where it is desirable to send additional information that is not available through the transaction process. For example, some payment processing networks may not support a message format that includes product identifiers such as SKU numbers. Additionally, periodic updates of inventory levels may be necessary, and purchase data may additionally be sent with this data to insure that the system is capturing the appropriate levels of client sales via data through the payment processing network, and to normalize the payment processing network purchase data. In this case, responsive to completing a transaction, the inventory system computer for a client may send a message to the analysis computer 113 that maps a completed transaction with additional purchase data (e.g., the SKU numbers involved in the transaction). Once the analysis computer 113 receives the additional purchase data, it can then update the purchase data received from the payment processing network 114.

Just as with purchase data, inventory data may be integrated into the analytics using the same methods described for purchase data. Whereas purchase data may be received as part of information sent to a payment processing network during an authorization, inventory data may be sent directly to an analysis computer 113. The data may be received from a merchant computer 102, and inventory system computer 112 or a supplier computer 106. Inventory data may include an update of client specific product inventories, but may additionally include specific sales data, including data for case sales or other purchases that would not be received as purchase data from a payment processing network. Inventory data may also be integrated with updates to client enrollment data or threshold selections for client analytics. In operations S307 and S309, processing of inventory data may be similar or identical to processing of purchase data from a payment processing network described elsewhere in this application.

After receiving the purchase data, the analysis computer then generates analytics for one or more analytics analyses based on the purchase data. In one potential implementation of analytics generation, analysis computer first categorizes the purchase data. This categorization by a purchase data input module may identify if the purchase data is related to a specific client, in which case it may be forwarded to analysis module 210 for inclusion in client database 270 (operation S306). The purchase data input module may also determine if the purchase data matches an appropriate category for inclusion in the market data database 260 (operation S308). Certain data may be included in both database 270 and 260, while other data will only be included in one database, and some data may be irrelevant to any active client, and not used by the system at all. If the data is used to update market database 260, data update module 212 will categorize the data appropriately, and will determine how the new purchase data will be integrated into various analytics.

In operation S310 either in response to receipt of the purchase data, at a fixed time, or in response to a customer request, data from market database will be used by product pricing analysis module 214, product demand analysis module 216, or product supply analysis module 218 to create input data for analysis module 210. Examples of input data derived from market data database include economic forecast data, market segment predictions related to trends in the overall market for a specific product or type of product, and normalization data that may be used to normalize input purchase data with overall purchases seen by a specific merchant or group of merchants.

As described above, market or economic forecasts as used herein may further refer to a prediction of an economic property that relates to or otherwise characterizes part or all of an economy. The modules of analysis computer 113 may build economic models based on economic data, adjusted economic data, and relationships with other data, to generate economic forecasts. As a specific example of other data that the analysis computer 113 may use includes purchase data and inventory data from all sources available to payment processing network 114 and analysis computer 113. As also described above modules of analysis computer 113 may further adjust purchase data to account for secondary effects.

Any combination of market, economic, or normalization analysis as described above and using data from market data database 260 may then be coupled with client specific data from client database 270, such that analysis module 210 may process the data to create supply chain analytics for a client. As described previously, the supply chain analytics may result in a wide variety of different messages for a client, based on analytics and client determined thresholds dictate the result of analytics, including a non-limiting list of examples such as estimated shortages, nonstandard scheduling related to holidays or large sporting events, weather related demand or supply issues, product failure/return issues that may impact demand, pricing changes, or any other trends identified as part of supply chain analytics. Other examples may include credit events that increase or decrease the ability of a client to stock certain levels of product, or location events that increase or decrease the floor space available for stocking and/or presenting products to customers.

In operation S312, messaging module may function to generate or cause the generation of a message to be sent to a client merchant, supplier, or consumer. The message may include information regarding any of the analytics discussed above, or any other analytics, statistical data, or analysis computer 113 output that meets with appropriate limitations, such as privacy and legal data sharing limitations. The messages may include details such as a current level of inventory, a recommendation to purchase additional products, a recommendation to hire or otherwise staff additional employees, or the previously discussed alerts including shortage alerts 252, scheduling alerts 254, weather alerts 256, failure/return alerts 258, pricing alerts 260, or trend alerts 262. In some embodiments, messaging module may include, be part of, or be in communication with an one or more communication channels to enable the delivery of a message or messages to the merchant.

An analysis computer 113 may include an interface for use by the merchant to set preferences with regards to analytics analyses, message delivery channels, triggers for the generation of an alert or message, etc. Such preferences may then be used by messaging module to arrange for the delivery of a message containing analytics about an analytics analysis or other information to the merchant as part of operation S312.

Similarly, in certain embodiments, for all of the above steps described in FIG. 3, any details for any step may be altered or adjusted by merchant selections in certain embodiments, such as the types of economic models to be using in analytics, the specific data to be used as part of analytics, and any messaging instructions.

As one particular alternative example of a potential method of creating a message using analysis computer 113, messaging module 260 may receive a request from a client. The request may be related to a trend alerts to be sent when analysis computer 113 determines that market trends are diverging from historical ordering patterns for a particular product sold at a merchant location of the client. Analysis computer 113 continually updates market database 260 with information related to the market trends and client database 270 continually updates ordering information from the client. At a regularly scheduled times product demand analysis may update a calculated market trend associated with the client's product using the market database 260. Analysis module 210 may then compare the calculated market trend from product demand analysis module 216 with a history of client order data from client database 270. When this analysis from analysis module 210 crosses a certain calculated threshold, a trend alert may be sent to the client via messaging module to 60. In certain embodiments the system may be structured to automatically create purchase order using purchase module 280 in a case where trends predict increased orders, or to delay a scheduled future purchase order where trends predict decreased orders.

In one other potential example market data database 260 may store merchant ordering information history for a particular product. If a client requests analytics related to that particular product and product supply analysis module 218 may compare and expected supplier inventory with the recent orders for the product. If product supply analysis module 218 sees a spike in product orders without a corresponding spike in inventory, or a drop in inventory, product supply analysis module 218 may provide this information to analysis module 210 for comparison with client specific alert thresholds. Thus, an increase in orders and/or a decrease in supply inventory may trigger a shortage of alert to be sent to a client via messaging module 260.

The small business vertical integration modules 280, 282, and 284 may further enhance functionality of analysis computer 113. For example promotions module 284 may cause analysis module 210 to adjust consumer specific thresholds when a particular promotion is occurring. Further, promotions module 284 may operate independent of the analytics to allow a merchant client to register or offer promotions from a particular supplier. Purchase module 280 may enable a merchant inventory system computer 112 to automatically create purchase orders when certain thresholds are seen by analysis module 210. Similarly, invoice integration module 282 may enable automatic creation of invoices for a supplier that is registered with the system. Additionally, payment module may further integrate the merchant and supplier systems by enabling a credit or card payment authorization process, similar to the authorization processes described above, to be initiated from supplier integration and analysis computer 113. Thus purchase module 280 and invoice integration module 282 may enable automatic ordering, delivery, invoicing, and payment for small businesses interacting with suppliers by leveraging a system that is integrated with a payment processing network.

V. Payment Processing Network

Figure 4:
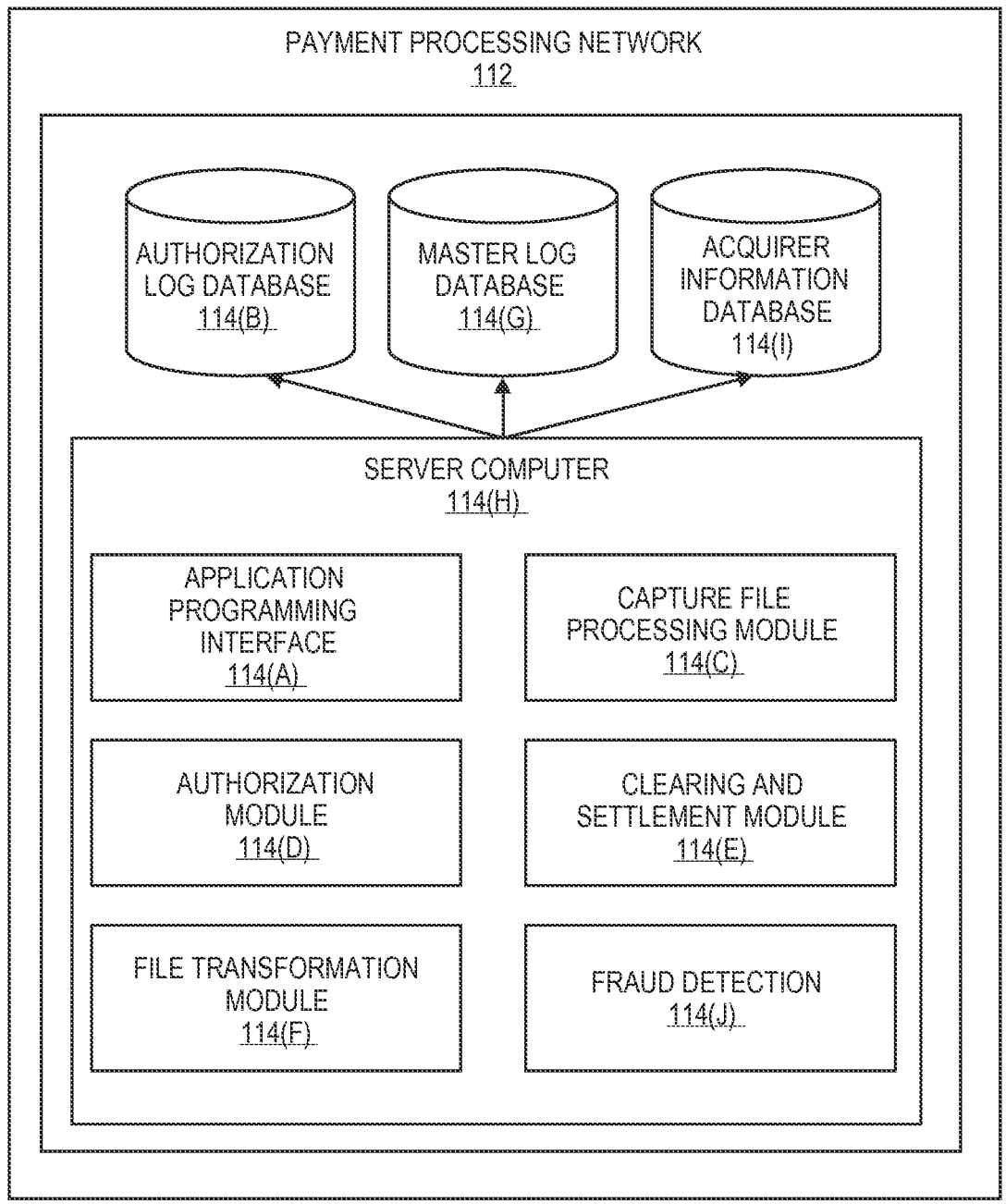
FIG. 4 is a diagram showing an example payment processing network for use as part of one potential implementation of the innovations presented herein.

A potential implementation of a payment processing network that may be used with embodiments of a vertical computing integration, analytics, and automation system will now be described. As depicted in FIG. 4, a payment processing network 114 may comprise a server computer 114(H) comprising an application programming interface 114(A), a capture file processing module 114(C), an authorization module 114(D), a clearing and settlement module 114(E), a file transformation module 114(F), and a fraud detection module 114(J). The various modules may be embodied by computer code, residing on computer readable media.

The server computer 114(H) may be operatively coupled to one or more databases. The one or more databases may comprise an authorization log database 114(B), a master log database 114(G), and a capture file database 114(I).

Authorization requests from acquirer and merchant systems may connection to payment processing network 114 through an application programming interface (API) 114(A). The capture file database 114(I) is a database that accumulates and stores capture files prior to clearing and settlement.

The authorization module 114(D) processes authorization request messages and determines the appropriate destination for the authorization request messages. The authorization log database 114(B) contains records of authorization. The data contained in the authorization log database 114(B) can be transmitted to participating acquirers by subscription. The data contained in the authorization log database 114(B) can be in a plurality of file formats (e.g. TC33 POS Data, Raw Data, and POSA files).

The clearing and settlement module 114(E) handles the clearing and settlement of transaction made on payment processing network cards. An example of the clearing and settlement module is Base II, which provides clearing, settlement, and other interchange-related services to VISA members.

The fraud detection module 114(J) can analyze data to identify trends or indicators of fraud that may not be detectible by individual merchants or issuers, and may be coupled to a messaging system to communicate potential fraud alerts.

The file and data conversion module 114(F) can convert authorization request messages from one format to another format. In embodiments of the invention, the authorization request messages are transmitted in XML, and the data conversion module 114(F) converts the message into an ISO format (e.g. ISO 8583) prior to sending them to issuers. In alternative embodiments, data conversion module 114(F) in the payment processing network 114 formats the authorization request message from its original file format into an ISO format (e.g. ISO 8583) or may alternatively simply verify that the data is in a preferred format. Data conversion module 114(F) then passes the authorization request message to the authorization module 114(D) which is also in the payment processing network 114. File transformation module 114(F) may additionally, in some embodiments, identify and direct purchase data to an analysis computer 113.

In further alternative embodiments, payment processing network 114 operates risk analysis module and may also include a multiple additional databases. Any database may include any hardware, software, firmware, or combination of the preceding for storing and facilitating retrieval of information. Also, the database may use any of a variety of data structures, arrangements, and compilations to store and facilitate retrieval of information. Risk analysis may be incorporated as part of a server or group of servers comprising payment processing network 114. In alternative embodiments, risk analysis may be structured as a separate server or group of servers.

Payment processing network 114 may include data processing subsystems, networks, and operations used to support and deliver authorization services, exception file services, and clearing and settlement services. An exemplary payment processing network 114 may include VisaNet™. Networks that include VisaNet™ are able to process credit card transactions, debit card transactions, and other types of commercial transactions. VisaNet™, in particular, includes an integrated payments system (Integrated Payments system) which processes authorization requests and a Base II system which performs clearing and settlement services. Payment processing network 114 may use any suitable wired or wireless network, including the Internet. Payment processing network may further include components such as an access control server, which can be a server computer that provides issuers, or other entities with the ability to authenticate consumers during an online transaction.

In some embodiments, the payment processing network 114 may include a separate authentication history server. An authentication history server can be a server which can receive and archive the result of authentication attempts in an authentication system. An authentication history server may record both successful and unsuccessful authentication attempts using particular account numbers or other related details. An authentication history server may receive data relating to authentications from issuers, payment processing networks, or any other entity involved in the authentication process. The data stored by the authentication history server can later be analyzed for various purposes. Alternatively, such information may be routed to a risk analysis server and can be combined with other information for risk scoring and fraud detection.

In some embodiments, the payment processing network 114 may include a directory server that can refer to a server computer that can be used to route messages containing enrolment and authentication information between a merchant plug-or an access control server. The directory server can also determine whether a consumer can utilize the authentication services and can apply business rules to modify the response to a merchant plug in. In some embodiments, the directory server can be operated by a service organization such as Visa. Alternatively, the above discussed portions of payment processing network 114 may be created as part of alternative networks coupled to payment processing network 114. Further embodiments may have various combinations or multiple copies of the above network elements, or may not include all of the above network elements.

VI. Computers and Computing Devices

The various participants and elements of the embodiments may operate one or more computer apparatuses to facilitate the functions described herein. FIG. 4 is a high level block diagram of a computer system that may be used to implement any of the entities or components described above. The subsystems shown in FIG. 4 are interconnected via a system bus 445. Additional subsystems such as a printer 444, keyboard 448, fixed disk 449, monitor 446, which is coupled to display adapter 482, and others are shown. Peripherals and input/output (I/O) devices, which couple to I/O controller 441, can be connected to the computer system by any number of means known in the art, such as serial port 484. For example, serial port 484 or external interface 481 can be used to connect the computer apparatus to a wide area network such as the Internet, a mouse input device, or a scanner. The interconnection via system bus 445 allows the central processor 443 to communicate with each subsystem and to control the execution of instructions from system memory 442 or the fixed disk 449, as well as the exchange of information between subsystems. The system memory 442 and/or the fixed disk 449 may embody a computer readable medium.

The computer system can be present in any of the elements in figures described herein, including analysis computer 113, for example. Similarly, the various participants, entities and elements in FIG. 1 may operate one or more computer apparatuses to facilitate the functions described herein. It will be readily apparent to one of ordinary skill in the art that many other hardware and software configurations are suitable for use with the present invention.

For example, the computer may be a desktop, portable, rack-mounted or tablet configuration. Additionally, the computer may be a series of networked computers. Further, the use of other microprocessors are contemplated, such as Xeon™, Pentium™ or Core™ microprocessors; Turion™ 64, Opteron™ or Athlon™ microprocessors from Advanced Micro Devices, Inc; and the like. Further, other types of operating systems are contemplated, such as Windows®, WindowsXP®, WindowsNT®, or the like from Microsoft Corporation, Solaris from Sun Microsystems, LINUX, UNIX, and the like. In still other embodiments, the techniques described above may be implemented upon a chip or an auxiliary processing board. Various embodiments may be based upon systems provided by daVinci, Pandora, Silicon Color, or other vendors.

In various embodiments, user input device is typically embodied as a computer mouse, a trackball, a track pad, a joystick, wireless remote, drawing tablet, voice command system, and the like. User input device typically allows a user to select objects, icons, text and the like that appear on the display via a command such as a click of a button or the like. An additional specialized user input device, such a magnetic stripe, RFID transceiver or smart card reader may also be provided in various embodiments. In other embodiments, user input device include additional computer system displays (e.g. multiple monitors). Further user input device may be implemented as one or more graphical user interfaces on such a display.

Embodiments of computer interfaces typically include an Ethernet card, a modem (telephone, satellite, cable, ISDN), (asynchronous) digital subscriber line (DSL) unit, FireWire interface, USB interface, and the like. For example, computer interfaces may be coupled to a computer network, to a FireWire bus, or the like. In other embodiments, computer interfaces may be physically integrated on the motherboard of a computer, or may be a software program, such as soft DSL, or the like.

RAM and disk drive are examples of computer-readable tangible media configured to store data such user, account and transaction level data, calculated aggregated data, super keys, sub keys and other executable computer code, human readable code, or the like. Other types of tangible media include magnetic storage media such as floppy disks, networked hard disks, or removable hard disks; optical storage media such as CD-ROMS, DVDs, holographic memories, or bar codes; semiconductor media such as flash memories, read-only-memories (ROMS); battery-backed volatile memories; networked storage devices, and the like.

In the present embodiment, computer system may also include software that enables communications over a network such as the HTTP, TCP/IP, RTP/RTSP protocols, and the like. In alternative embodiments of the present invention, other communications software and transfer protocols may also be used, for example IPX, UDP or the like.

In various embodiments, computer typically includes familiar computer components such as a processor, and memory storage devices, such as a random access memory (RAM), disk drives, and system bus interconnecting the above components.

It should be understood that embodiments of the present invention as described above can be implemented in the form of control logic using computer software in a modular or integrated manner. Based on the disclosure and teachings provided herein, a person of ordinary skill in the art will know and appreciate other ways and/or methods to implement the present invention using hardware and a combination of hardware and software Any of the software components or functions described in this application, may be implemented as software code to be executed by a processor using any suitable computer language such as, for example, Java, C++ or Perl using, for example, conventional or object-oriented techniques. The software code may be stored as a series of instructions, or commands on a non-transitory computer readable medium, such as a random access memory (RAM), a read only memory (ROM), a magnetic medium such as a hard-drive or a floppy disk, or an optical medium such as a CD-ROM. Any such non-transitory computer readable medium may reside on or within a single computational apparatus, and may be present on or within different computational apparatuses within a system or network.

It should be understood that some embodiments may include sending a transaction authorization request to a payment processing network and thereafter receiving an authorization response. Thereafter, from a computer apparatus, sending a request for analytics relating to an analytics analysis associated with a merchant or class or category of merchant. Embodiments of the present invention may then receive the analytics relating to the product data, which the merchant then uses to make an actionable decision.

It should be understood that other embodiments may include enrolling with an analytics service offered by a payment processing network. Once enrolled, sending a transaction authorization request to a payment processing network, and, thereafter, receiving an authorization response. Thereafter, from a computer apparatus, sending a request for analytics relating to an analytics analysis associated with a merchant or class or category of merchant. Embodiments of the present invention may then receive the analytics relating to the analytics analysis, which the merchant then uses to make an actionable decision.

Yet other embodiments may include enrolling with an analytics service offered by a payment processing network. Once enrolled, sending a current status of an analytics analysis to a merchant timing system. After conducting payments over a payment processing network, receiving an alert message or communication that includes analytics regarding an analytics analysis.

A recitation of "a", "an" or "the" is intended to mean "one or more" unless specifically indicated to the contrary.

The above descriptions are illustrative and are not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

One or more features from any embodiment may be combined with one or more features of any other embodiment without departing from the scope of the invention. For example, any of the above described analytics may be combined with any other suitable analytics in any suitable manner in methods or systems according to embodiments of the invention. Thus, although specific features are separately described in this application, they may be combined in certain embodiments of the invention.

What is claimed is:

1. A method comprising:
generating, by a first computer, an authorization request message for a payment transaction, wherein the authorization request message comprises a first format that includes purchase data including product identifiers, and an account number for a portable consumer device;
transmitting, by the first computer, the authorization request message to a payment processing network computer, wherein the payment processing network computer is configured to:
  convert the authorization request message from the first format to a second format, the second format being compliant with ISO 8583,
  transmit the authorization request message in the second format to an issuer computer that issued the account number,
  receive an authorization response message from the issuer computer,
  transmit the authorization response message to the first computer,
  calculate, based on the purchase data and inventory data associated with the product identifiers and at least one supplier, a demand for one or more products associated with the product identifiers, and
  generate or modify at least one future purchase order for the one or more products based on the demand for the one or more products;
receiving, by the first computer, the authorization response message from the payment processing network computer that includes an approval of the payment transaction associated with the account number; and
receiving, by the first computer, the at least one future purchase order for the one or more products.

2. The method of claim 1 wherein the payment processing network computer is further configured to automatically transmit the at least one future purchase order for the one or more products to the at least one supplier.

3. The method of claim 1 wherein the payment processing network computer comprises a server computer.

4. A first computer comprising:
one or more processors; and
a storage medium comprising computer readable instructions configured to:
  generate an authorization request message for a payment transaction, wherein the authorization request message comprises a first format that includes purchase data including product identifiers, and an account number for a portable consumer device;
  transmit the authorization request message to a payment processing network computer, wherein the payment processing network computer is configured to:
    convert the authorization request message from the first format to a second format, the second format being compliant with ISO 8583,
    transmit the authorization request message in the second format to an issuer computer that issued the account number,
    receive an authorization response message from the issuer computer,
    transmit the authorization response message to the first computer,
    calculate, based on the purchase data and inventory data associated with the product identifiers and at least one supplier, a demand for one or more products associated with the product identifiers, and
    generate or modify at least one future purchase order for the one or more products based on the demand for the one or more products;
  receive the authorization response message from the payment processing network computer that includes an approval of the payment transaction associated with the account number; and
  receive the at least one future purchase order for the one or more products.

5. The method of claim 4 wherein the first computer is a merchant computer.

6. The first computer of claim 4 wherein the payment processing network computer comprises a server computer.

* * * * *